United States Patent [19]
Hata

[11] Patent Number: 6,138,555
[45] Date of Patent: Oct. 31, 2000

[54] FOOD PROCESSING DEVICE AND ELECTRIC SYSTEM FOR THE PROCESSING DEVICE, AND HIGH VOLTAGE-WEAK PULSE ELECTRIC CURRENT IMPRESSER FOR FOOD

[75] Inventor: Kazuyoshi Hata, Kanagawa, Japan

[73] Assignees: Kowa Business Planning of America, Ltd., New York, N.Y.; Hata Kazuyoshi, Kanagawa, Japan; Mitsubishi International Corp., New York, N.Y.

[21] Appl. No.: 09/399,278

[22] Filed: Sep. 17, 1999

[30] Foreign Application Priority Data

Sep. 18, 1998 [JP] Japan .................................. 10-265307

[51] Int. Cl.⁷ ........................................................ A23L 3/32
[52] U.S. Cl. ................. 99/451; 99/483; 99/358; 422/22; 426/237; 363/52
[58] Field of Search ...................... 99/451, 483, DIG. 14, 99/358; 422/22, 23, 24; 363/51, 52, 140; 426/237, 244

[56] References Cited

U.S. PATENT DOCUMENTS

| | | | |
|---|---|---|---|
| 5,276,394 | 1/1994 | Mayfield | 323/356 |
| 5,588,357 | 12/1996 | Tomikawa et al. | 99/451 |
| 5,690,978 | 11/1997 | Yin et al. | 99/451 X |
| 6,050,178 | 4/2000 | Uemura | 99/451 |

*Primary Examiner*—Reginald L. Alexander
*Attorney, Agent, or Firm*—Brown Raysman Millstein Felder & Steiner LLP

[57] ABSTRACT

A safer power supply is used in conjunction with a system for preserving food, oil, organs, or other organic material. The power supply constantly applies a high voltage-weak pulse electric voltage, generated by a transformer using an alternating-current power supply of commercial frequency, with the voltage applied through an electrically conducting electrode to the food or other organic materials. In the power supply, one pole of the secondary winding is sealed for increased safety. By applying or impressing high voltage-weak pulse electric current to frying oil or other organic materials using the power supply and/or the preservation system, the high voltages restrain deterioration of frying oil and enables long-term use. Installed on a food container which is placed in a refrigerator, the power supply safely applies high voltage-weak pulse electric current to meat and fish in the container, and so suppresses propagation of germs and deterioration.

10 Claims, 12 Drawing Sheets

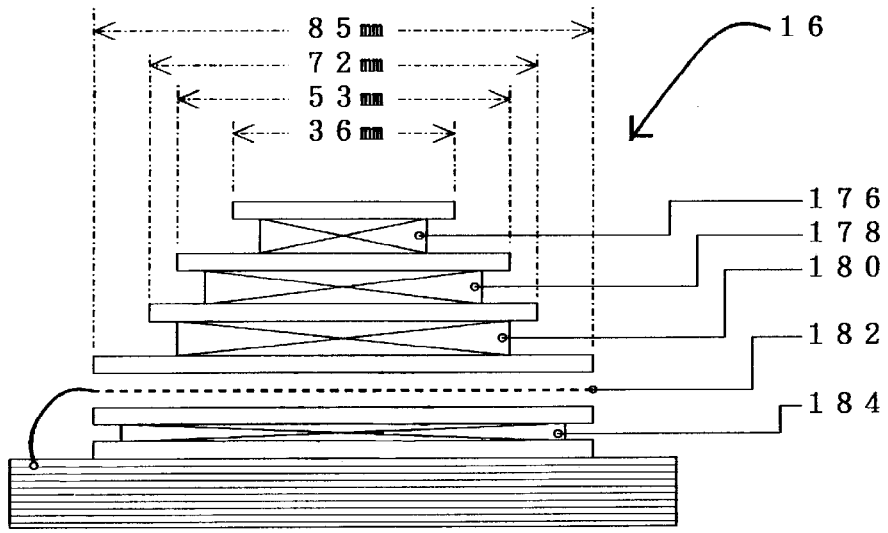
F I G. 19
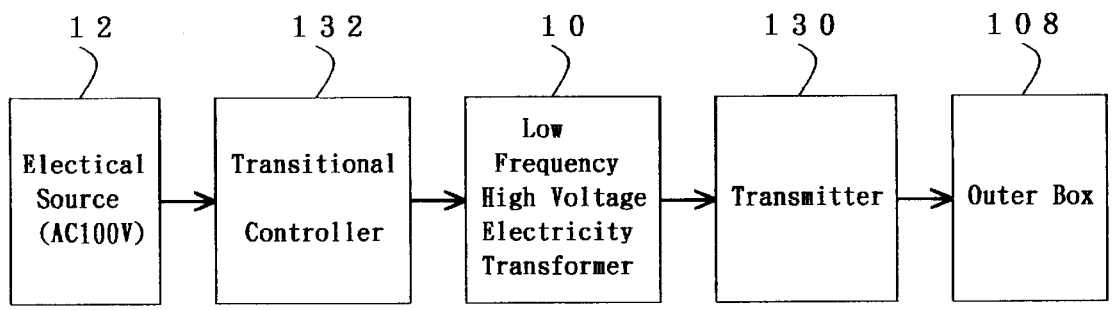
F I G. 20

FOOD PROCESSING DEVICE AND ELECTRIC SYSTEM FOR THE PROCESSING DEVICE, AND HIGH VOLTAGE-WEAK PULSE ELECTRIC CURRENT IMPRESSER FOR FOOD

BACKGROUND OF THE INVENTION

The present invention relates to preservation of organic materials, and, more particularly, to a preservation system for use as a food preserving system that preserves food using high voltage, a power supply for medical devices to treat humans or to preserve organs using high voltage, and food preserving system in which the power supply is applied to the food.

It is widely known that applying high voltage to food such as vegetables, fruits, grains, meats, and seafood improves their taste, prevents the color change when defrosting, and enables long-term storage. However, previously such high voltage systems system connect both secondary winding poles of a transformer to the food preserving system to apply the high voltage, thus possibly endangering the operator by exposing him/her to high voltage. Therefore, none of the prior art high voltage food preserving systems have been put to practical use.

Also in the medical field, high voltage is used for treatment of humans and animals. However, those devices may expose the subjects, humans or animals, to high voltage and therefore are potentially dangerous.

Thus, safety is vital to this type of device. A need exists for a safe applicator of high voltages for use in preserving organic tissue.

Oxidation by heating and moisturizing is the main cause of deterioration of frying oil and other organic materials. However, there does not exist in the prior art a device which impresses or applies high voltage-weak pulse electric current to frying oil to enable long-term storage and to reduce the amount of discharge. In addition, no device in the prior art is known which impresses/applies a high voltage-weak pulse electric current to food to restrain the deterioration and decay.

SUMMARY OF THE INVENTION

One objective of the disclosed invention is to provide a high voltage-weak pulse electric current applicator for food which restrains deterioration and decay, and thus enables long-term storage.

In order to achieve the objective discussed above, a high voltage-weak pulse electric current impresser/applicator for food or other organic materials runs high voltage-weak pulse electric current generated by a transformer, in which a primary winding is connected to an alternating-current power supply of commercial frequency, and a pole of the secondary winding is sealed in an insulated board, such that the generated high voltage-weak pulse electric current is applied to the food and/or organic material.

The disclosed high voltage/weak pulse applicator system and method stop the deterioration of organic materials, such as food, oil, and even human tissue in medical treatments, by acting on moisture associated with the organic materials, while increasing the safety in operating with such high voltages.

Using a transformer to provide voltage elevation, a first pole provides the high voltage to the food or other organic materials, and a second pole of the transformer is sealed to increase the safety in applying such high voltages, while not losing tastes and flavors of foods treated with such high voltages. The transform boosts the alternating-current power supply of commercial frequency, so that high voltage-weak pulse electric current generated from the device is applied to food or other organic material, such as frying oil. Accordingly, deterioration of the food and/or oil is restrained and enables long-term use of such treated food and/or oil. By applying the high volume-weak pulse electric current to food such as fish and meat contained in the container to which or in which the disclosed device is installed and/or stored in a refrigerator, propagation of bacteria is restrained and does not experience decay or deterioration in the long-term.

When a secondary winding pole of the transformer is connected to the electrode of the food preserving system, and the other secondary winding pole is sealed, the following advantages are obtained compared to the prior art, in which prior art transformers connect both secondary winding poles of the transformer to the food preserving system or medical device. With regard to the food preserving system, the high voltage sealed transformer preserves the taste and the flavor of the food and at the same time, the operator is less likely to be exposed to high voltages. With regard to the medical device, the subject/patient is less likely to be exposed to high voltage. With regard to the organ preserving devices, the operator is less likely to be exposed to high voltage, and the high voltages enable long-term preservation of the organs.

The transformer may be placed in the electrically insulated resin, and the other pole of the secondary winding may be sealed inside the electrically insulated resin, such that the operator is less likely to be exposed to high voltage. The poles of the secondary winding may be connected via a resistance that is connected parallel to the secondary winding of the transformer and is located on the secondary winding of the transformer. In addition, the power supply may include a choking coil that is located on the primary winding of the transformer and is connected in series to the primary coil of the transformer for increased safety in generating the high voltages.

The food preserving system includes, besides the safer power supply, a container that provides food preserving space and a electrode connected to the output section of the power supply and is located in the electrically insulated preserving space. Food is then preserved using high voltage impressed to the electrode. Using this system, the operator is less likely to be exposed to high voltage. The food container may have a ground, such as an earth connection section, which connects the container to the ground/earth electric potential, and so the operator is less likely to be exposed to high voltage.

In one embodiment, the container includes a main body with an opening at least on one side which provides a food preserving space, and includes a lid for closing the open space. Using such a container in a food preserving system, the power supply may have a circuit that shuts off the voltage to the output section by receiving a signal from the sensor which detects either a human body or opening of the lid. Accordingly, the system is made safe for the operator by shutting off the high voltage to the electrode when the operator approaches the system or opens the lid.

BRIEF DESCRIPTION OF THE DRAWINGS

FIG. 19 illustrates a side plan view of a transformer coil winding; and

FIG. 20 illustrates a functional block diagram of the components of the disclosed food preserving system.

DETAILED DESCRIPTION OF THE PREFERRED EMBODIMENT

Figure 1:
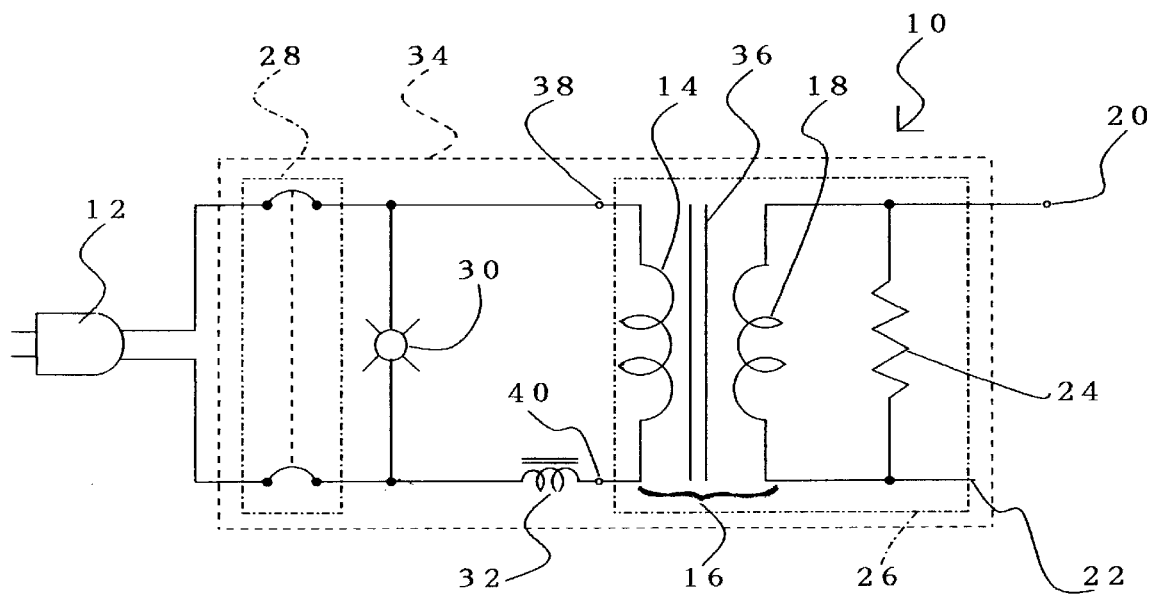
FIG. 1 illustrates a circuit diagram that shows an example of the power supply of the present invention.

Referring to FIG. 1, the disclosed food preservation system includes the disclosed power supply 10 which receives single-phase commercial alternating-current electric power from the plug 12 which is plugged into an outlet of a commercial alternating-current electric source, and so the plug 12 provides the power to primary coil or winding 14 of the insulated transformer 16 for voltage elevation. Therefore, the plug 12 acts as the input section of alternating-current electric power to the power supply 10. The input section of the alternating-current may also be a general terminal section.

The secondary coil or winding 18 of transformer 16 has a first pole connected to output section 20, and a second pole 22 of secondary coil 18 is connected to the first pole through a load resistor 24. The transformer 16 and the resistor 24 are fabricated to be molded into or otherwise positioned or disposed in an electric insulated resin material 26 such as epoxy resin, which may form the housing or casing of the combination of the transformer 16 and resistor 24.

Between the plug 12 and the transformer 16, the power supply 10 may include a circuit breaker 28 which ensures the safety of users of the power supply, and which also protects the power supply 10 from receiving an overcurrent. In addition, to further enhance safety, the power supply 10 may also include a display light 30 that lights while the power supply 10 is operating, and may further include a choking coil 32 which is connected in series to the primary coil 14. In addition, the components of the power supply 10, such as the transformer 16, resistor 24 resin material 26, circuit breaker 28, and choking coil 32 are disposed within a housing or casing 34 which may be composed of an electrically insulated material such as vinyl chloride.

In operation, the power supply 10 generates a high voltage-weak pulse electric current at the first pole 20. In an illustrative embodiment, the core 36 of the transformer 16 may be composed of iron, with the primary coil 14 and the secondary coil 18 inserted into the epoxy resin 26. The terminals 38–40 of the primary coil winding 14 are connected to the voltage source through the choking coil 32, which may be a transformer; through the circuit breaker 28, which may be a no-fuse breaker; and through the display light 30, which may be a pilot lamp; and through the plug 12, which may be a standard electrical outlet plug to receive about 100V alternating-current power supply of commercial frequency.

To ensure safety in operation, the poles 20–22 of the secondary coil 18 are connected together through the resistor 24 to generate a high voltage-weak pulse electric current of, for example, about 5 kV–10 kV and in about 10 mA–100 mA range at the output section or terminal being the pole 20.

The output section 20 is connected to an electrode of a food preserving system described herein. The output section 20 may be either an outlet placed on the casing 34, the tip of a cable connected to the output section 20 which extends from casing 34, or a plug placed at the tip of the cable. In addition, the display light 30 may be, for instance, placed at or near the socket of casing 34.

Figure 2:
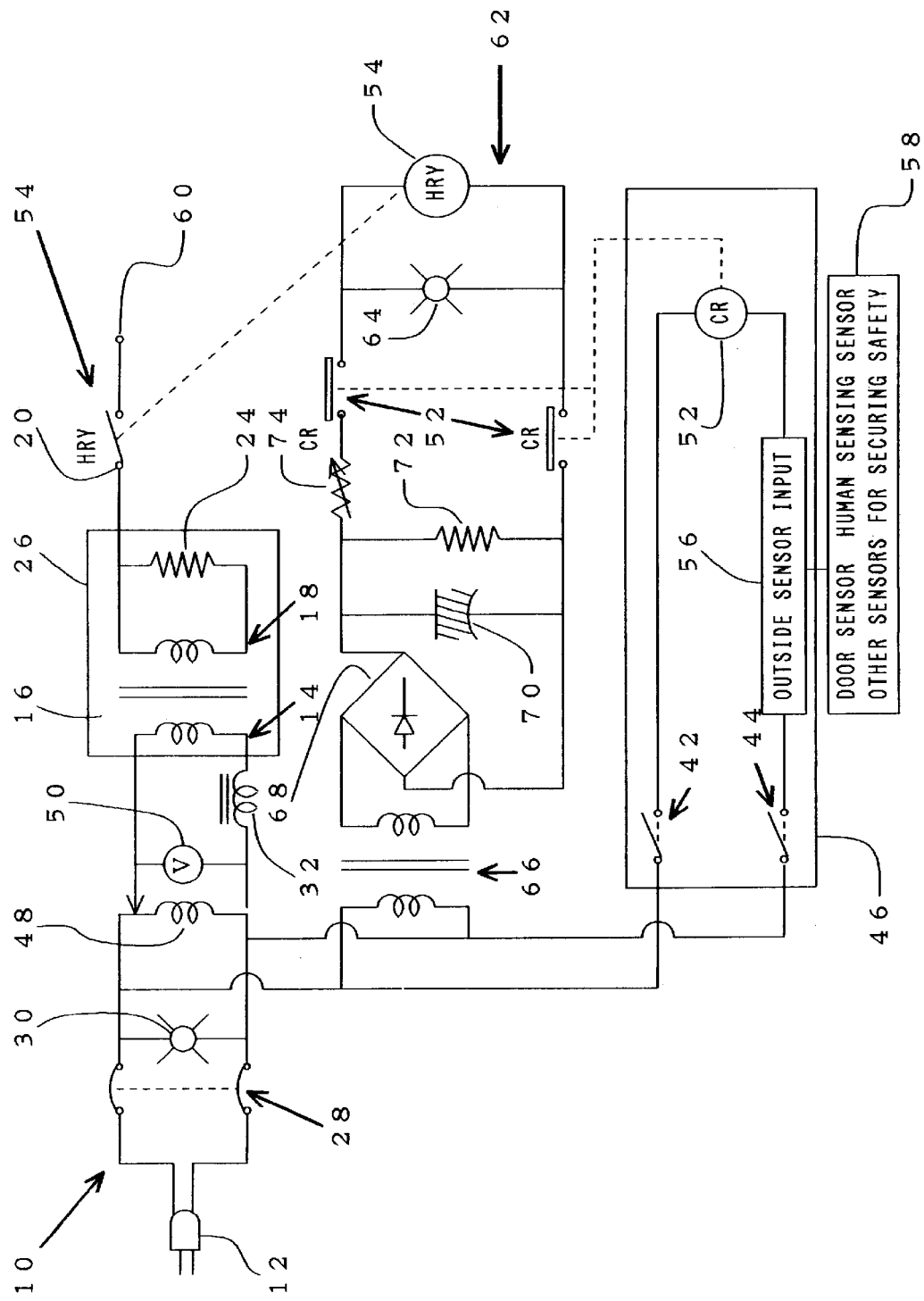
FIG. 2 illustrates an example of electric wave at the output.

In alternative embodiments, such as the control circuit 46 connected to the power supply 10 shown in FIG. 2, power control switches 42–44 may be positioned between the plug 12 and the transformer 16, for example, between the plug 12 and breaker 28, in order to turn the power supply 10 on and off. A voltage controller, such as an adjustable transformer 48, may also be included in the power supply 10, and may be connected, controlled by, or incorporated in the control circuit 46. The voltage controller 48 may be placed at the primary winding of transformer 16 to control the voltage level at of output section 20 by controlling the input voltage to transformer 16.

When the power supply 10 is on, the alternating-current voltage inputted into the plug 12 is elevated by the transformer 16 to an appropriate voltage level depending on the subject, such as preservation of food or of body organs. In this manner, high voltage is generated at the output section 20, and the high voltage-weak pulse electric current operates on a subject inside a preservation container, such as a food container of a food preserving system.

In the alternative embodiment shown in FIG. 2, the power supply 10 includes the voltage controller 48 which is located at the primary winding 14 of the transformer 16 to control the voltage going into the primary winding 14 of the transformer 16. A voltmeter 50 may also be included in the power supply 10 and located parallel to the output side of voltage controller 48 to check the input voltage controlled by voltage controller 48. Alternatively or in addition, the voltage controller 48 may include a slidack and/or a variable resistance for controlling the voltage.

The control circuitry 46 may also control the power supply 10 to automatically supply the high volume-weak pulse electric current generated at the output terminal 20; for example, the control circuit 46 may control at least one high-voltage control relay 52 to switch an output switch 54, labeled HRY. The output switch 54 may be a magnetic switch for detecting a magnetic current passing through the switch 54 from the control relay 52, as shown in FIG. 2. Accordingly, the output switch 54 may be magnetically coupled but electrically isolated from the remainder of the power supply 10 and the control circuit 46 in order to safely switch the high voltages at the output section 20 and to avoid injuring a human operator of the power supply 10 and/or control circuit 46, and further to avoid damaging the power supply 10 and control circuit 46 during switching of high voltages. Thus, the power supply 10 and/or the control circuitry 46 utilize devices and components which increases the safety of the overall system for use when food is preserved in a container with a lid such as refrigerator.

The switches 42–44 may be high voltage on/off switches located at an input side of the control circuit 46, and the switches may be, for example, a single pole, double throw switch. The control circuit 46 may include an outside sensor input 56 which receives a signal detected by an outside sensor 58, such as a door sensor, a human sensing sensor, or other sensors for securing safety. For example, the outside sensor 58 may respond either to the presence, proximity, or movement of a human body, such as an operator of the power supply 10; or to the opening of a lid of a food storage container of the food preservation system. Upon detecting such conditions requiring enhanced safety, the control circuit 46 conducts electricity to the exciting coil of the relay 52.

The relay 52 may conduct electricity to the exciting coil of the high voltage relay 54 either when the manual on/off switches 42–44 connected to the input section of the power supply 10 are turned on, or when the control circuit 46 is not operating. Otherwise, the relay 52 does not conduct electricity to the exciting coil of the relay 54.

In the alternative embodiment shown in FIG. 2, safety is enhanced by including redundant safety measures. For example, when the sensor 58 does not emit the detection signal even though either of the on/off switches 42–44 is closed, the relay 52 is closed to close the contact of the relay 54, and high voltage is supplied to output section 20. However, if the sensor 58 emits a detection signal when the on/off switches 42–44 are off, high voltage is not generated at the final output 60 since the exciting coil of the relay 54 receives electricity and thus closes, which in turn opens the relay 54 to prevent output of high voltage.

Thus, in the power supply 10, when an operator approaches the food preserving system incorporating the power supply 10 to open a lid of the food preserving system, or when the lid is opened, the high voltage to the final output contact 60 is shut off, and therefore it is safer for the operator to be near and/or to operate the food preserving system.

In other alternative embodiments, the on/off switches 42–44 may be omitted. Also, high voltage may not be generated at the output section 20 by using a normally open contact instead of normally closed contact of the relay 54. Accordingly, the closing of the normally open contact by activating the relay 54 causes a specified high voltage to be provided at the output section 20, and the high voltage is discontinued upon the activation of the relay 52 to open the normally open contact of the relay 54 when the sensor 58 outputs a detection signal.

As shown in FIG. 2, a high voltage display circuit 62 may be connected to the power supply 10 and/or the control circuit 46, which controls the activation of the control relay 52 and the high voltage relay 54 by regulating the currents while activating a lamp 64 to indicate operation. A transformer 66 receives the input voltage at the input section of the power supply 10, and the transformer 66 applies a transformed voltage, which may be a stepped-up voltage, to a bridge 68 which applies a voltage to a capacitor 70 in parallel with a resistor 72, and to a variable resistor 74 to provide relay activation voltage to the relay 54 when the control relay 52 is closed. When such relay activation voltage is generated, a lamp 64 is then lit to indicate to an operator that the power supply 10 is closing the relay 54 to generate and provide the output voltage to the final output 60 for application to food or other organic materials for preservation.

Figure 3:
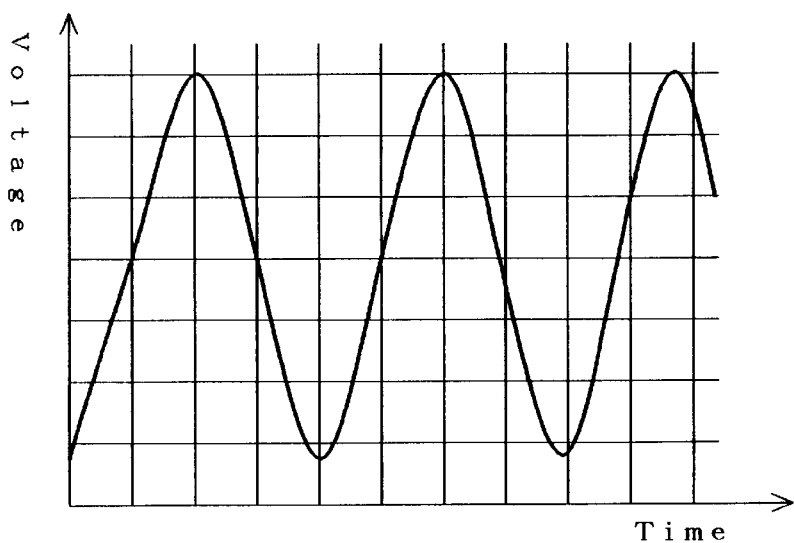
FIG. 3 illustrates another example of the power supply of this invention.

FIG. 3 shows an example of the voltage wave generate at the output section 20, with the vertical axis illustrating generated output voltage in units, for example, of 5 kV; and with the horizontal axis illustrating time in units of 0.005 secs. The voltage at the output section may thus range from several kV to 20–30 kV, and preferably from 4 kV to 20 kV. In particular, a more preferable set of generated voltages range from 5 kV to 15 kV. The electric current at the output section 20 may range from several mA to several hundred mA, and preferably from 10 mA to 100 mA.

Figure 4:
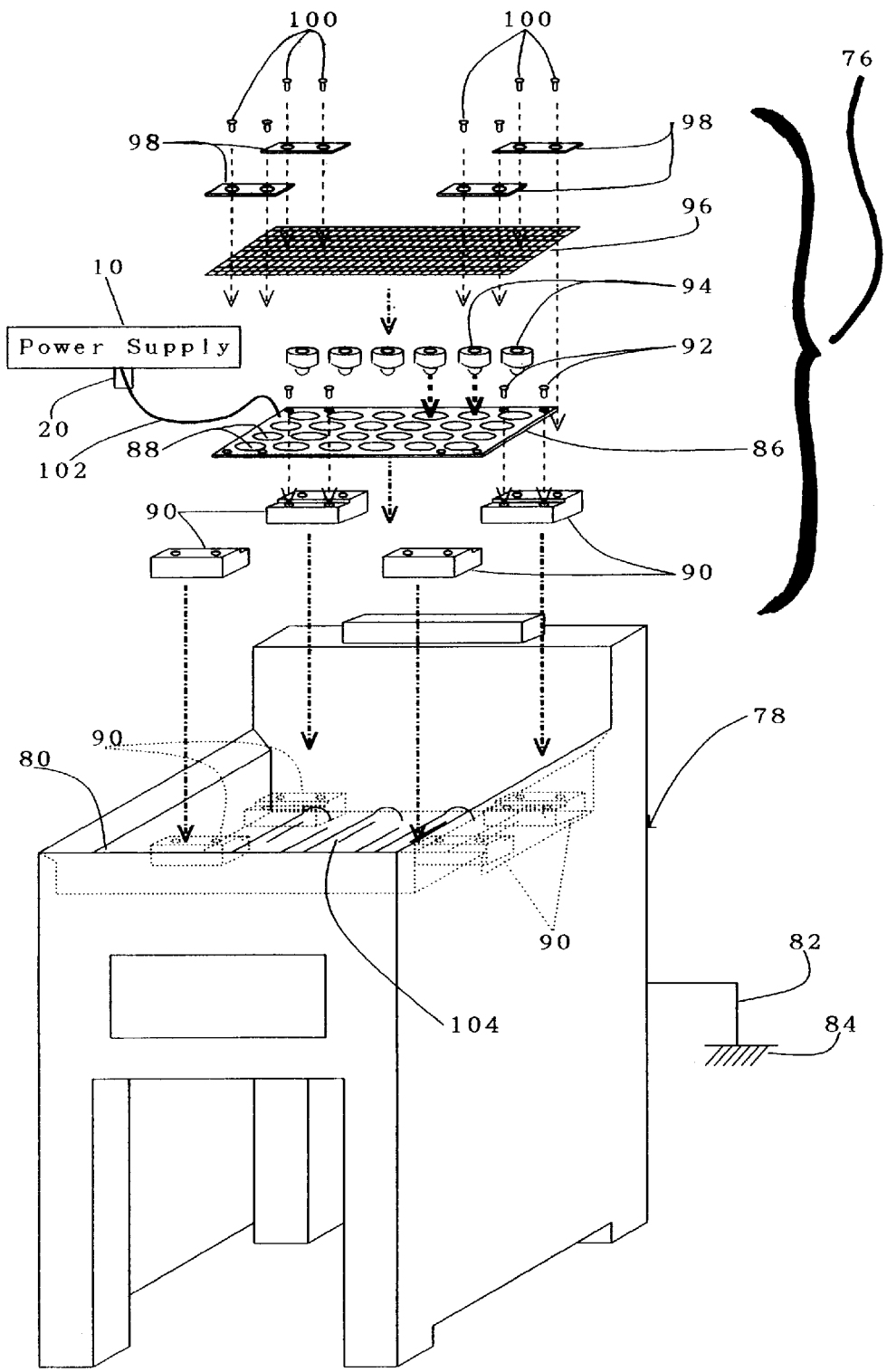
FIG. 4 illustrates a front perspective view of the disclosed food preserving system with parts separated.

In one example application of the disclosed power supply 10 shown in FIGS. 1–2 for generating the voltages shown in FIG. 3, a food preserving system 76 shown in FIG. 4 includes the disclosed power supply 10 and a fryer 78. The fryer 78 has a container 80 for storing frying oil, with the container 80 being, for example, box-shaped with an opening on the top. The fryer 78 is preferably composed of a non-corrosion material such as stainless steel, and the fryer 78 also includes a connection 82 to a ground 84. The fryer 78 may also include a set of attachments such as heating range 104 which heats the frying oil in the container 80 by electricity, gas, or other fuels, and a temperature regulator known in the art may be provided which adjusts the temperature of the frying oil in the container 80.

An electrode 86 is composed of an appropriate metal material such as stainless steel, and may be shaped in the form of a rectangular plate. The electrode 86 has numerous throughholes 88, which may be circular, and the electrode 86 is positioned on the fryer 78 in the container 80 on block-shaped spacers 90 composed of electrically insulated material. The electrode 86 may be mounted on the spacers 90 and optionally secured thereto by screws 92, for example, to each of the bottom corners of the electrode 86.

Insulation blocks 94 may be mounted and/or positioned in the throughholes 88, with the insulation blocks forming an insulation stage on the electrode 86. A protector 96 is also provided which is composed of electrically insulated material, and the protector 96 may have a rectangular mesh shape to be positioned upon the insulation stage formed by the blocks 94. The protector 96 is attached to the spacers 90 at, for example, each corner of the protector 96 by an insulation plate 98 and a set of screws 100, which protects the operator from directly touching the electrode 86.

In the illustrative embodiment shown in FIG. 4, the electrode 86 and the protector 96 are positioned and oriented to be horizontally disposed inside the container 80. The electrode 86 is thus physically and electrically separated from the container 60 by the spacers 90, and is also separated from the protector 96 by the insulation blocks 94. The upper portion or surfaces of the electrode 86 are also covered by the protector 96. However, any frying oil in the container 80 is able to flow upwards and downwards through the gaps provided by the internal surface of the container 80 and the electrode 86, through the holes of the electrode 86, through the mesh-shaped protector 96, and through the holes of each insulation block 94.

When in use, the electrode 86 is located inside the container 80, and an appropriate amount of frying oil is put into the container 80. The frying oil is then heated with a heater 104, for example, located in the main body of fryer 76. The power supply 10 has the output section 20 connected to the electrode 86 by a conducting wire 102. When the frying oil reaches certain temperature, food for frying or tempura, such as vegetables, meats and fishes, are put into the container 80. While the food is cooked, the power supply 10 operates to apply a high voltage to the electrode 86, and the food and oil in the container 80 receives high voltage-weak pulse current electricity, which causes the consumption, oxidation, and deterioration of the frying oil to be restrained.

After the described treatment by the fryer 76 using the disclosed power supply 10, the treated oil may be used in long-term food preparation, the quality of the fried food may be maintained for long periods, the smell is less transferable between foods, the freshness of the food is maintained for long periods, overall taste is improved, and frying may be performed in low temperatures. In addition to these advantages, the food preservation system using the fryer 76 and power supply 10 is safer than the prior art power supplies in which both secondary poles of the transformer 16 would be connected to the container 80 and the electrode 86.

In operation, electricity generated by the power supply 10, which may an "IMPULSE"-brand "HIGH VOLTAGE GENERATOR", is run through the electrode 86 sunk in the frying oil in the container 80. The voltage is approximately 2 kV to 6 kV, depending on the amount and the volume of the oil. The effects of passing such voltages through the oil are as follows: the voltages restrain the deterioration of the oil by thinning the moisture in the oil, promoting the vaporization of the moisture, and activating the oil at the same time; and the voltage generates ions which restrain the smoke and smell of the oil and which retrain the transfer of the smell between the prepared foods.

Because of the first effect which reduces moisture, the moisture vaporizes 5–10 times faster than normal. Therefore, any bread of the treated food may be fried fast and crisply, without loosing the moisture and the taste of the food. Also such moisture reduction also reduces the amount of the oil absorbed into the food. Since the heat efficiency of the fryer 76 is equal to heat efficiencies of known fryers, the reduction of moisture also reduces the time spent on cooking by 25%.

Figure 5:
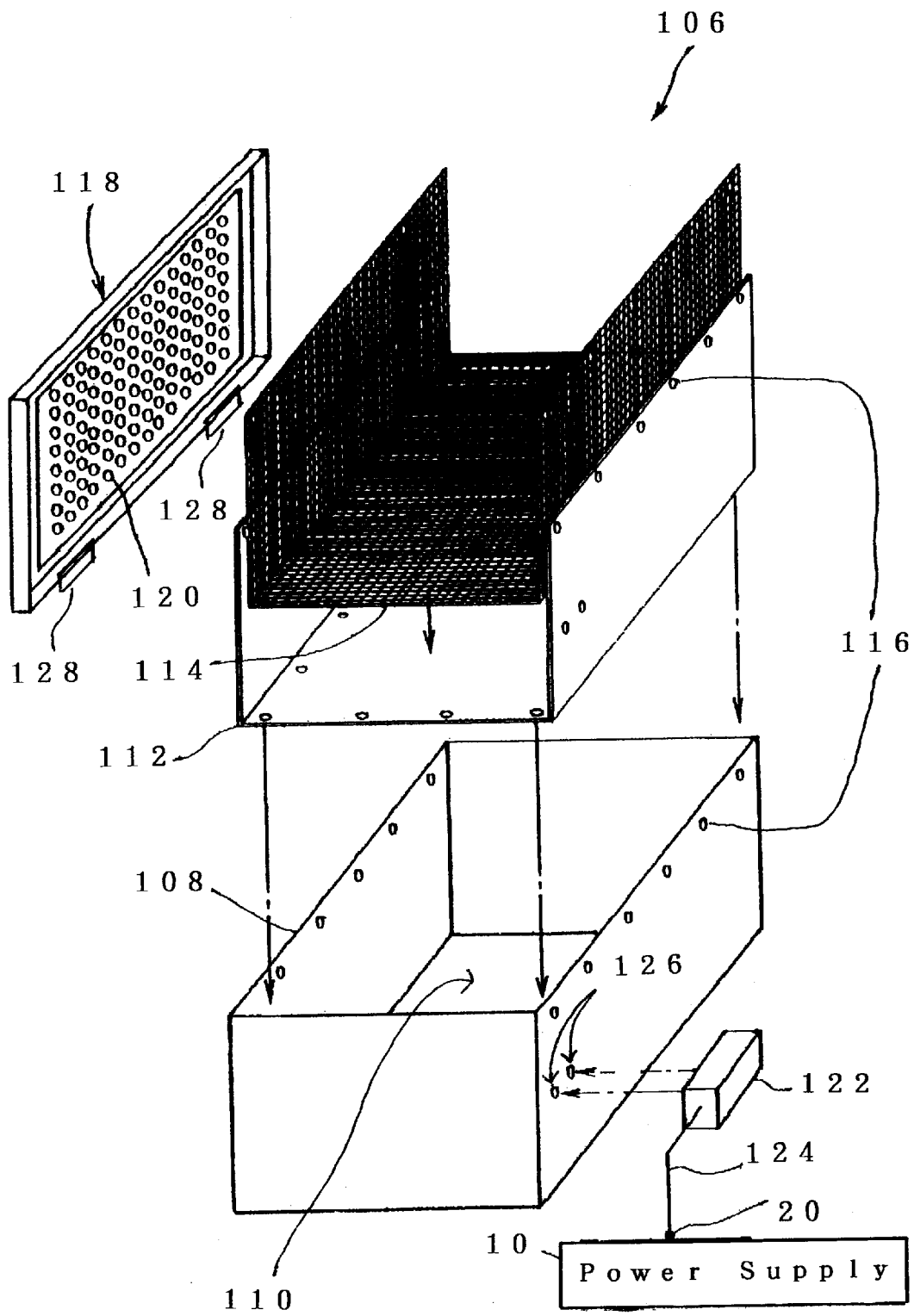
FIG. 5 illustrates a front perspective view of an alternative embodiment of the disclosed food preserving system with parts separated.

In an alternative embodiment shown in FIG. 5, another food preserving system 106 includes the power supply 10 connected to a food container 108 which has an upward opening. The container 108 processes food stored therein by applying the high voltages from the power supply 10 to the food. The container 108 may be composed of an electrically insulated material, such as synthetic resin, which may be fabricated to have a box shape with an upward opening 110.

An electrode 112 and a protector 114 are configured and dimensioned to fit within and to be positioned within the container 108. The electrode 112 is composed of metal such as stainless steel, and the protector 96 is composed of an electrically insulated resin. In an illustrative configuration, the electrode 112 may be fabricated from a bended metal plate, and is positioned within the container 108 to open upwards. The protector 114 may be made from a mesh of electrically insulated material bent to open upwards, and is positioned inside the cavity formed by the upwardly bent electrode 112. The electrode 112 and the protector 114 may be attached to the container 108 with screws or other securing devices, for example, using holes 116 in the electrode 112 and the container 108.

The combination of the container 108, the electrode 112, and the protector 114 forms an opening 110 through the top of the combination, which may be closed by a lid 118, and the lid 118 which may include a reflective plate or reflective coating 120 facing into opening. Accordingly, any electromagnetic waves generated within the container 108 are reflected and held within the container 108. Besides increasing the efficiency of operation of the container 108, the use of the lid 118 and the reflective plate 120 prevents the operator from contacting the electrode 112. The electrode 112 is connected to the power supply 10 via a repeater 122 attached to a side, to the top, or to the bottom of the container 108 The power supply 10 provides the high voltage through the output section 20 to the repeater 122 via a wire connection 124. The repeater, in turn, is electrically connected to the electrode 112 through a connection and/or ports 126 in the container 108. For example, electrically conductive screws mounted in the ports 126 may electrically couple the repeater 122 to the electrode 112.

In use, the food preservation system 106 has food, such as vegetables, fruits, grains, meat, and fish, placed onto the protector 114, and the container 108 is closed by the lid 118. An appropriately high voltage is then applied to the electrode 112 from the power supply 10 through the repeater 112. In this manner, high voltage-weak pulse current electricity is applied to the food inside the container 108. Compared to the prior art methods which would use both secondary poles 20–22 of the transformer 16 connected between the power supply 10 and the electrode 112 in the container 108, the disclosed food preservation system 106 using the power supply 10 of FIGS. 1–2 having a sealed pole 22 includes advantages for food preservation; for example, taste and flavor improves, the smell of each food item is less transferable to other food items, freshness is maintained longer, and sugar content increases, in addition to the safety advantages for an operator using the disclosed food preservation system 106.

In particular, using the power supply 10 with the control and safety components shown in FIG. 2, the food preservation system 106 is safer in the ability to cut off the high voltage applied to the electrode 112 when a human body approaches the container 108, or when the operator opens the lid 118. The sensor 58 which detects an approaching or proximate human body may be placed on the outer surface of the container 108, and the sensor which detects the opening of the lid 118 may be placed between the container 108 and the lid 118, for example, substantially adjacent to hinges 128 to detect motion or changes of state of the hinges indicating opening of the lid 118.

The food preserving system 106 shown in FIG. 5 may also be used as a batch-processing device; as a food compartment of a refrigerator, a freezer, or a cooling room; or in a defrosting device for frozen food. When used in a defrosting device, the food preserving system 106 restrains moisture-loss and discoloration of the defrosting food therein. As described herein, the food preserving system 106 utilizing the power supply 10 shown in either of FIGS. 1–2 improves the tastes and flavors of food, prevents discoloration when defrosting food, enables long-term storage of food, and processes food without losing tastes and flavors. In addition, the use of high voltage does not affect or harm the operator of the system 106 due to the safeguards described herein.

The disclosed power supply 10 and the configurations of food and/or organic material treatment compartments such as the fryer 76 and the system 106 may be used not only for food preservation systems, but also for medical treatment devices for humans and animals, as well as organ preservation devices. For example, when the power supply 10 shown in FIGS. 1–2 is used for a medical treatment device, the subject patient being treated is less likely to be affected by the high voltages. Also, when the power supply 10 is used for an organ preservation device, the operator is less likely affected by the high voltage and also the preservation period of the organ stored therein increases.

In operation, the food preservation system runs the electricity generated by the "IMPULSE" power supply 10 through the electric discharge device placed in a refrigerator or other food preservation containers, with the refrigerator or containers including the electrode 112. The interior wall and the floor of the refrigerator may be required to be insulated beforehand. The high voltages enable the management of the temperature and the freshness of perishable foods in the refrigerator. The voltage depends on the volume of the interior of the refrigerator, and the utilized electric current is the main factor in operation for preserving food. The effects of applying such voltages are as follows: in use to defrost frozen food, the voltages prevent the loss of the weight and the taste of the food in such refrigerated operations; the voltages help the food to ripen to the level that the food is suppose to be and/or help bring back the food to the ripens level, and the voltages cause the food to stay in that ripened level; the voltages also increase the sweetness of fruit as well as ripen the fruit. Therefore, the use of voltages for food preservation increases the sweetness and reduces the bad smell of fresh produce.

In addition, additional effects of the use of high voltage include: restraining the decay and/or oxidation of meat and fish; increasing the taste and the color of the food; maintaining the moisture of the refrigerated food; restraining restrains the germination of root vegetables, such as potatoes, onions, etc.; and increasing the volume and the weight of cereals. The different effects of applying such high voltages to food or other organic materials are provided by running the high voltage through the food, and by placing the food within the electric field associated with the voltages. A medical college in Tokyo has conducted basic research on these functions and effects of high voltages on foods, oils, and other organic materials such as organs.

Figure 6:
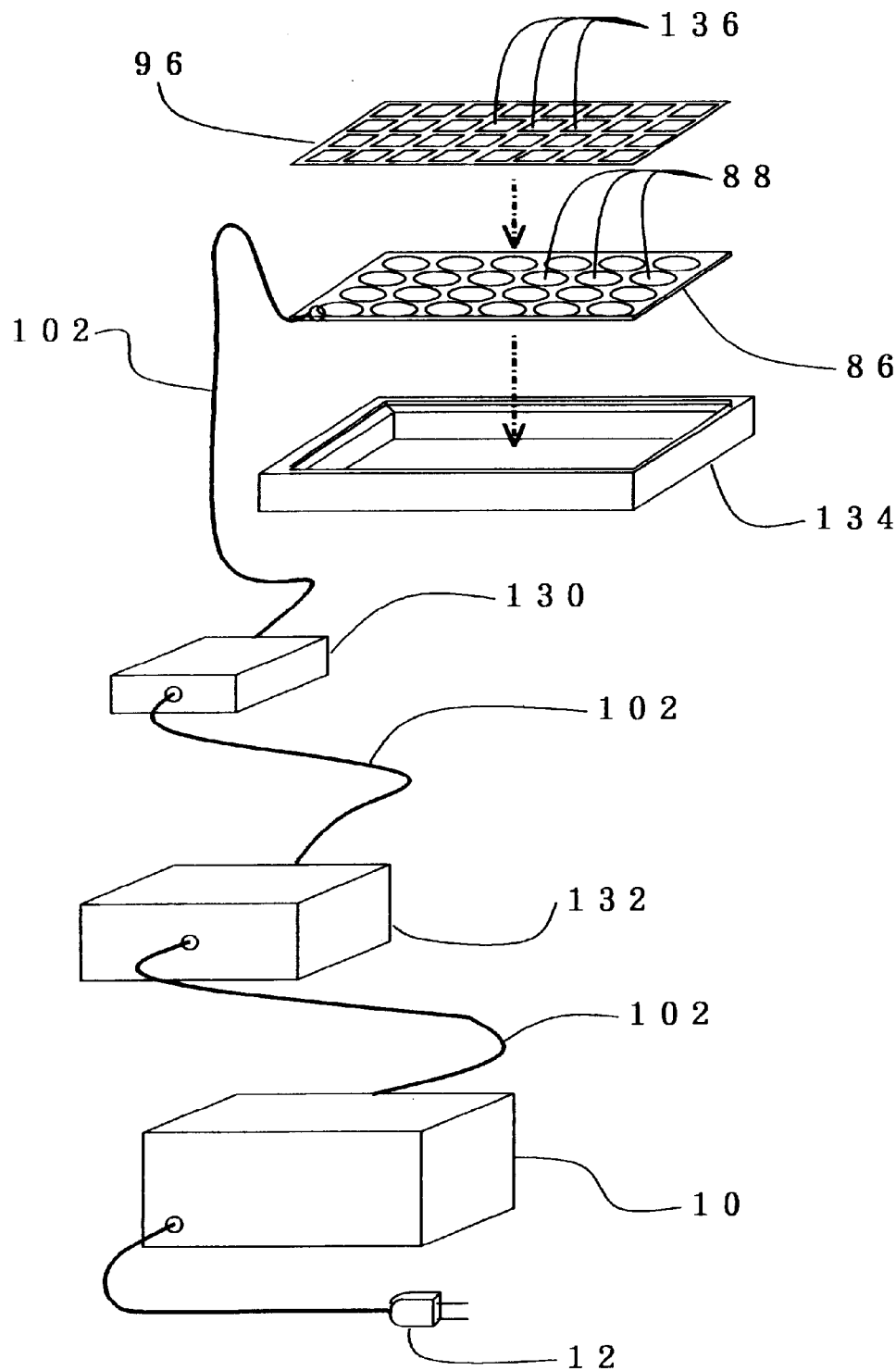
FIG. 6 illustrates a perspective view of components of the disclosed food preserving system with parts separated.
Figure 7:
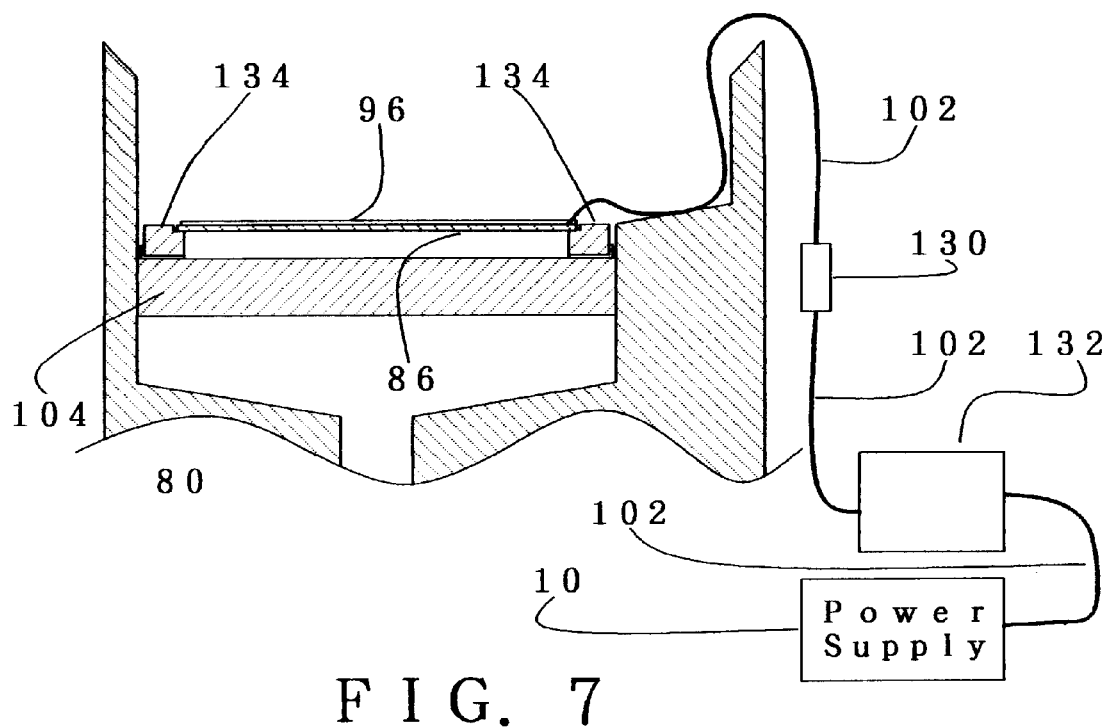
FIG. 7 illustrates a side cross-sectional view of the disclosed food preserving system.
Figure 8:
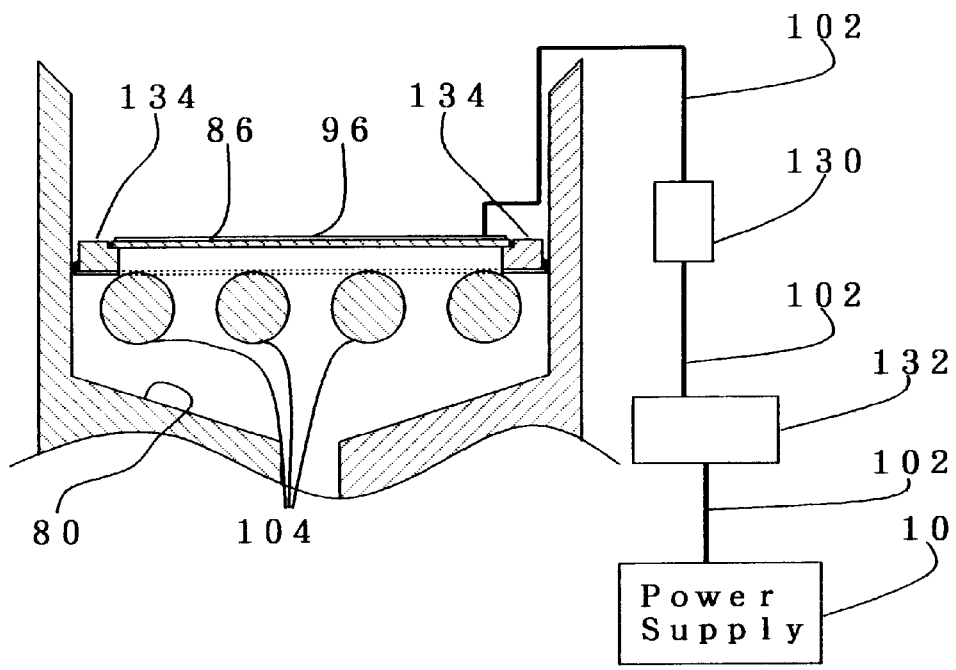
FIG. 8 illustrates an alternative side cross-sectional view of the disclosed food preserving system.

Referring to FIG. 4, the components are described in greater detail in conjunction with FIGS. 6–8. FIG. 6 illustrates the connection of the electrode 86 to the power supply 10 through a conducting wire 102, which may be flexible, and through a repeater 130 and an intermediate controller 132. The repeater 130 may be any known circuitry for boosting or maintaining the voltage waveform generated by the power supply 10 and shown in FIG. 3 to be applied to the electrode 86. The intermediate controller 132 may include the control circuit 46 and/or the display circuit 62 shown in FIG. 2, and may include other control devices such as circuit breakers.

The electrode 86 may be positioned upon an insulating frame 134 which is mounted in the container 80 of the fryer 76, so that the electrode 86 may be positioned within the container 80, which may be a frying oil tub. The electrode 86 may be removably mounted on the frame 134 for periodic cleaning. The insulating frame 134 may be rectangular and may be composed of ceramic material, for example, to withstand the heat of the oil and the fryer 76.

The protector 96 shown in FIGS. 4 and 6 may be a mesh and/or a board with numerous holes 136, such as rectangular holes, with the protector 96 positioned to cover the electrode 86. The protector 96 may be an insulating board composed, for example, of polytetrafluorethylene-based materials, commercially available as "TEFLON" from "E.I. DU PONT DE NEMOURS AND COMPANY".

FIG. 7 shows a side cross-sectional view of the electrode 86 mounted in the container 80 over the heating elements 104, which may be elongated pipes, and FIG. 8 shows a front cross-sectional view of FIG. 7, in which the electrode 86 is positioned relatively near the heating elements 104 such that frying oil being heated is also treated by the application of high voltage-weak pulse electric currents and voltages from the power supply 10. The high voltage-weak pulse electric currents discharged by the electrode 86 to the frying oil is short-range, and its transport factor of the electric field strength is approximately 200 mm at 10 kV and 10 mA.

Table 1 illustrates the results of tests to determine how values of acid, peroxide, and carbonyl vary as time passes when high volume-weak pulse electric current is applied to the frying oil in the container 80. The tests are done by standard fat-and-oil analytical test methods, using a carbonyl value for absorbency per 1 g of specimen. The test specification is as follows:

1. reference oil: soybean salad oil, 27 liter/24.3 kg;
2. fryer: 30 liter middle heating direct fire table fryer;
3. applied voltage: 10 kV, with current 100 mA;
4. surface area: 1,760 $cm^2$;
5. temperature: 150° C.±2° C.;
6. water spray amount: 300 cc every 2 hours, for water 6.2 g/oil kg/hr.;
7. area contacting air: 72 $cm^2$/oil kg.

TABLE 1

| Heating Time (Hr.) | Acid Value | Peroxide Value (meq/kg) | Carbonyl Value |
| --- | --- | --- | --- |
| 0 | 0.1 | 0.2 | 1.6 |
| 10 | 0.1 | 2.0 | 3.2 |
| 20 | 0.2 | 2.0 | 4.0 |
| 30 | 0.2 | 2.2 | 4.6 |
| 40 | 0.3 | 2.3 | 5.8 |
| 50 | 0.4 | 2.2 | 7.1 |

An acid value of 2.0 is the standard for exchanging frying oil.

As shown above, by applying high voltages and low currents, the frying oil has been restrained from experiencing increases of the values of acid, peroxide and carbonyl for long time periods, which indicates a restraint of deterioration. Therefore, since the frying oil may be used for long-term uses such as cooking, the disclosed power supply and food preservation system contribute to reducing the generation of waste oil and to improve working environments.

For a long-length conveyer-type frying oil tub as the container 80, several high voltage-weak pulse electric current applicators may be placed in parallel.

Figure 9:
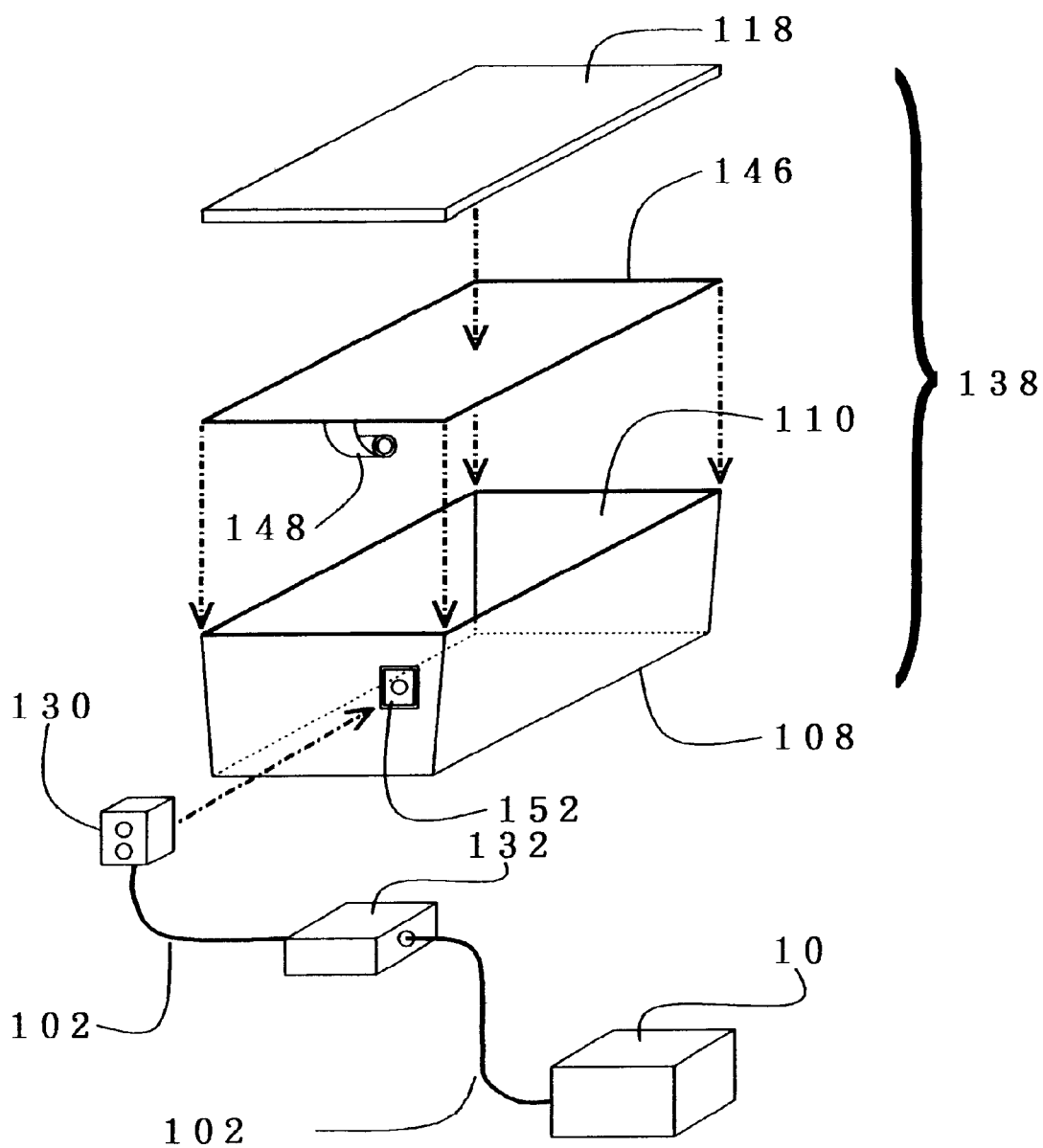
FIG. 9 illustrates another perspective view of an alternative embodiment of the disclosed food preserving system with parts separated.
Figure 10:
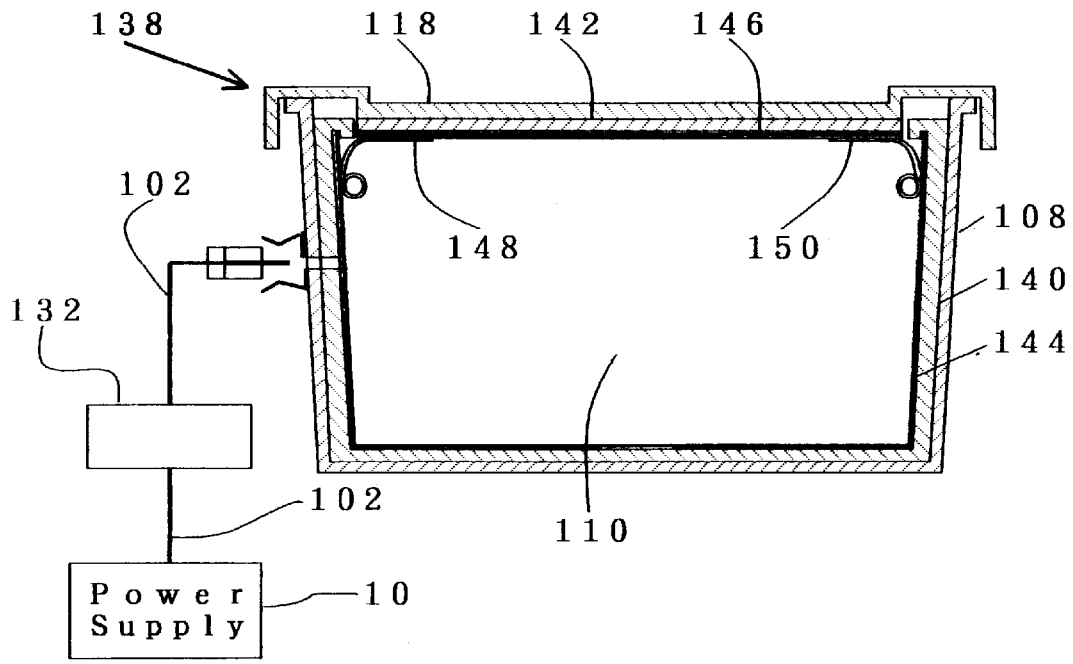
FIG. 10 illustrates a side cross-sectional view of the food preserving system of FIG. 9.
Figure 11:
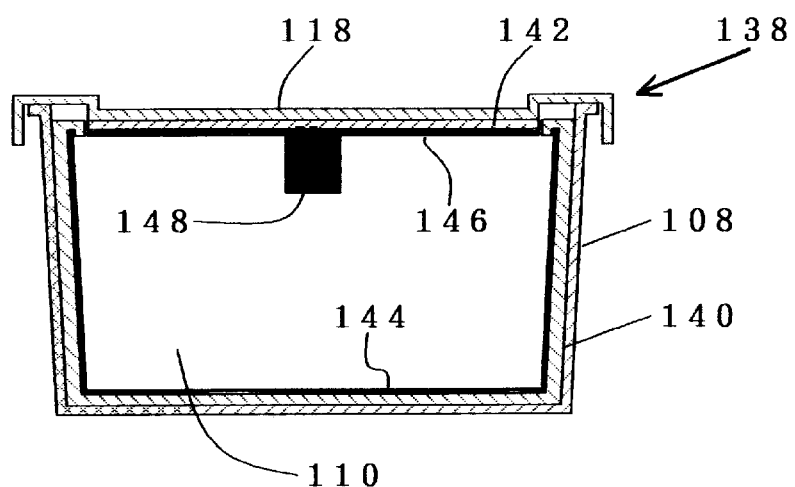
FIG. 11 illustrates a front cross-sectional view of the food preserving system of FIG. 9.

In an alternative embodiment for food preservation, FIG. 5 is referred to in conjunction with FIGS. 9–11 to provide a food storage system 138 having a container 108 and a lid 118. FIG. 10 illustrates a side cross-sectional view and FIG. 11 illustrates a front cross-sectional view of the food preservation system 138. The container 108 and the lid 118 may have walls 140, 142 composed of vinyl chloride and/or insulating materials. Interior surfaces 144, 146 of the walls 140, 142, respectively, are composed of electrically conductive material, such as aluminum foil made. Electrical contacts 148, 150 are provided to electrically couple the conductive surfaces 144, 146. For example, the electrical contacts 148, 150 may be formed to be spring-like contacts to connect the electric conducting materials 144, 146 of the container 108 and the lid 118, respectively, when the lid 118 is closed.

On a side of the container 108 is a jack 152 for allowing the repeater 130 to electrically engage the electrical contacts 148, 150 for conducting electricity from the power supply 10. The insulating material of the walls 140, 142 and the electric conducting material of the contacts 148, 150 may be conjoined by synthetic resin board, for example, to which aluminum is vacuum evaporated or otherwise secured. The container 108 and the lid 118 may be composed of synthetic resin, cardboard, and/or wood.

The food storage container 138 is used in a refrigerator or other food preservation systems, with the jack 152 connected by a plug to the repeater 130, such that the power supply 10 constantly applies high volume-weak pulse electric current to the food contained in the container 108 in the space 110.

Figure 13:
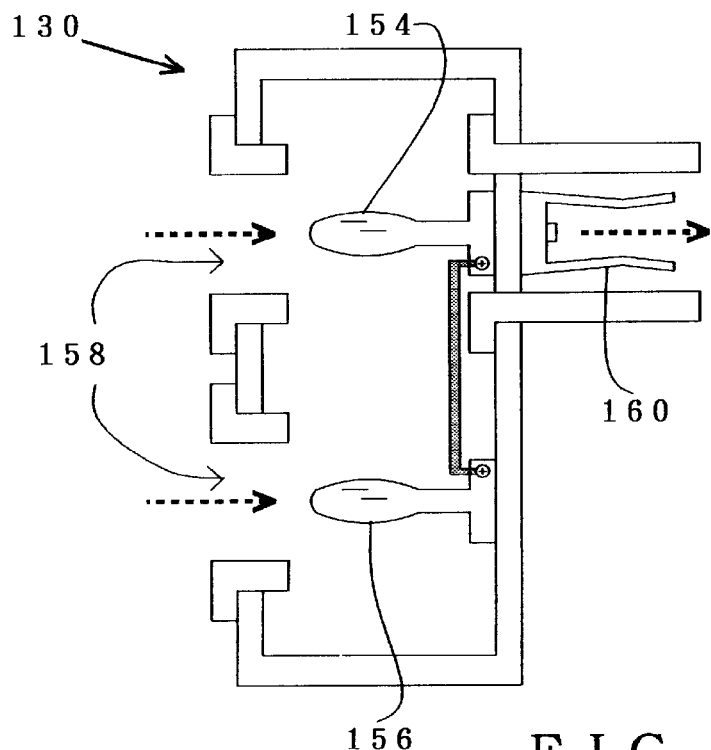
FIG. 13 illustrates a side cross-sectional view of a dual plug connection for connecting a repeater to a fryer.

Table 2 compares the development the number of general bacteria, using a normal agar medium and measured in units per gram (/g), on various food samples when (a) the sample is placed in the food storage container 108 and then placed in the refrigerator, and when (b) the sample is directly placed in the refrigerator. The impressing voltage is 10 kV and the current is 100 mA. The asterisk entries "*" in Table 2 indicate food which was discarded because of decay.

input port 158, a wire 102 from the power supply 10 and/or the intermediate controller 132. The repeater 130 also includes a connector 160 to engage a plug 162 of the jack 152 to provide a secure electrical connection between the repeater 130 and the container 108. As shown in FIG. 13, the repeater 130 may include a plurality input ports 158 for connecting inserted components with corresponding plugs 154, 156, respectively. For example, as shown in FIG. 18, one plug 156 may be connected to the intermediate controller 132, while another plug 154 may be connected to another repeater 130, such that multiple repeaters 130 and multiple boxes 108 may be connected in series to a single power supply 10.

Figures 14, 15:
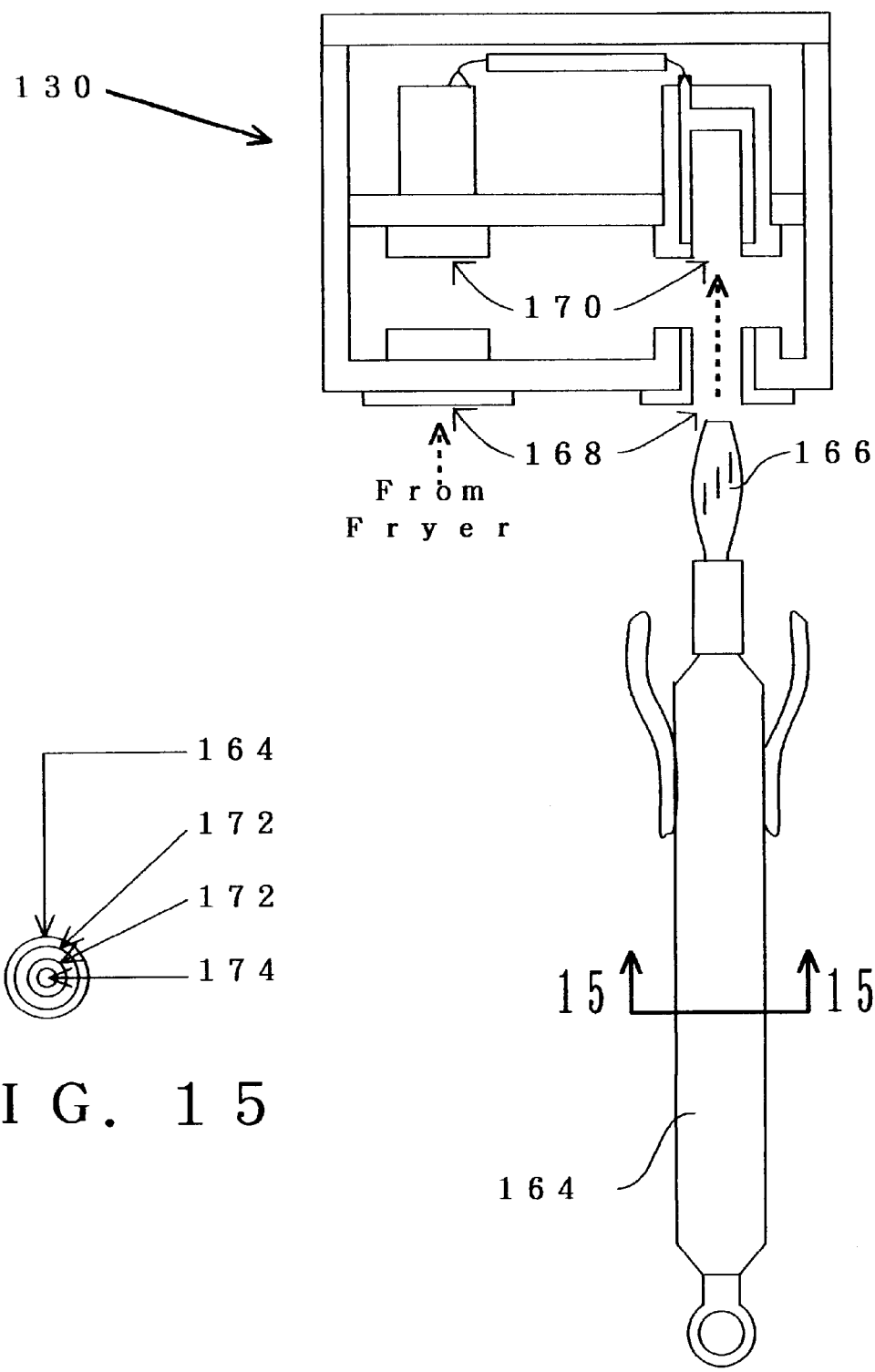
FIG. 14 illustrates a side cross-sectional view of a single plug connection for connecting a repeater to a food preserving container.
FIG. 15 illustrates a cross-sectional view of the plug of FIG. 14 along lines 15—15.

FIG. 14 illustrates a plug 164 for use with a repeater 130 adapted to receive inputs from both the fryer 76 and the power supply 10 through the plug 164. A head portion 166 of the plug 164 is adapted to be inserted through at least one receptacle 168 to engage a socket 170 in the repeater 130. FIG. 15 illustrates a cross-sectional view of the plug 164 along lines 15—15, in which multiple layers of insulating material 172 surround an axial core conductor 174 for conveying the electricity from the power supply 10.

Figure 16:
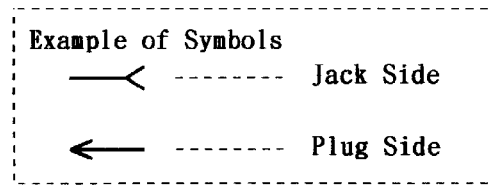
FIG. 16 illustrates examples of symbols representing plug connections.
Figure 17:
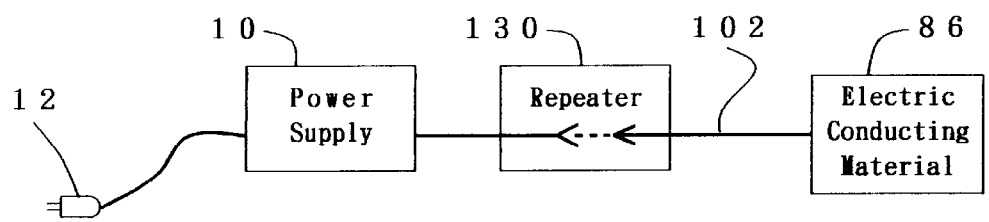
FIG. 17 illustrates a block diagram of a fryer.
Figure 18:
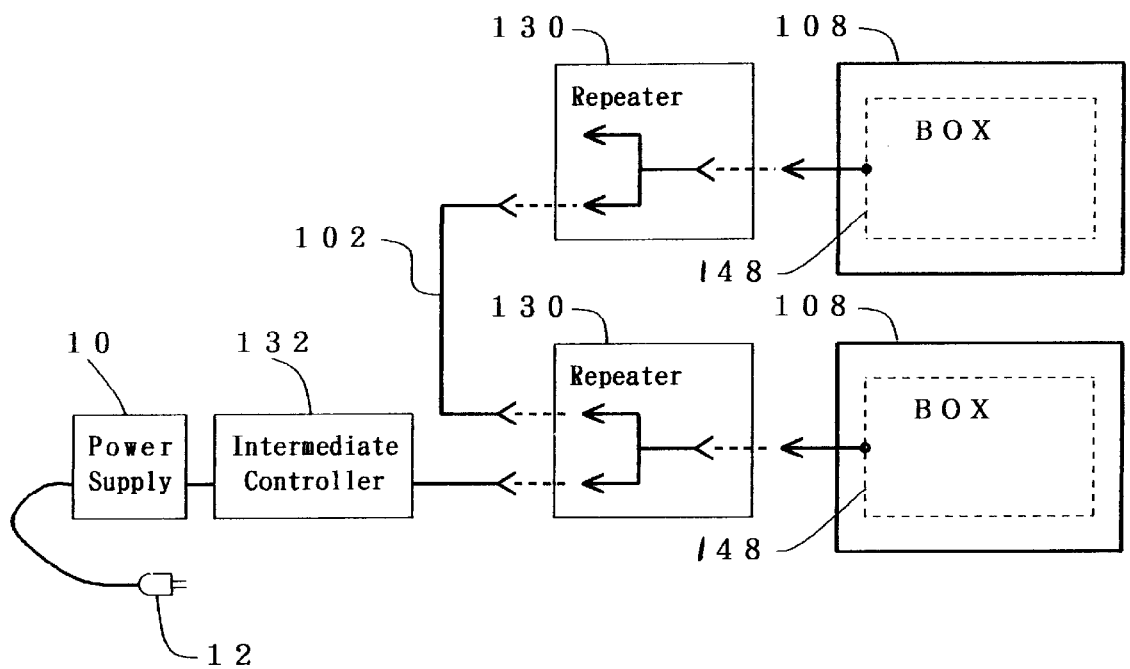
FIG. 18 illustrates a block diagram of a food preserving container.

FIG. 16 illustrates examples of symbols used in FIGS. 17–18 to illustrate interconnections of the repeaters 130 with various components. FIG. 17 illustrates a connection for use with the fryer 76 shown in FIG. 4, in which electricity is provided to the electrode 86 composed of electrical conducting material and using the plug connection shown in FIG. 15. FIG. 18 illustrates the connection of repeaters in series to multiple food containers 108 with electricity from a single power supply 10, with plug connections as shown in FIG. 14.

Referring to FIG. 19 in conjunction with FIGS. 1–2, the transformer 16, which has magnetic components 176–180

TABLE 2

| Sample | | Immediately | 72 hrs later | 120 hrs later | 144 hrs later | 168 hrs later |
|---|---|---|---|---|---|---|
| Tuna | a | <300/g | <300/g | <300/g | <300/g | <300/g |
|  | b | <300/g | <300/g | 40,000/g | >100,000/g | * |
| Flounder | a | <300/g | <300/g | 1,000/g | 1,300/g | 5,600/g |
|  | b | <300/g | 42,000/g | >100,000/g | * | * |
| Squid | a | 1,300/g | 1,900/g | 4,600/g | 30,000/g | 88,000/g |
|  | b | 1,300/g | >100,000/g | >100,000/g | * | * |
| Raw | a | 5,000/g | 50,000/g | >100,000/g | >100,000/g | >100,000/g |
| Beef | b | 5,000/g | >100,000/g | * | * | * |
| Conk | a | <300/g | <300/g | <300 | 1,600/g | 2,500/g |
| Fish | b | <300/g | 5,400/g | >100,000/g | * | * |
| Lobster | a | 1,000/g | 5,500/g | 7,800/g | 36,000/g | >100,000/g |
|  | b | 1,000/g | >100,000/g | >100,000/g | * | * |
| Sponge | a | <300/g | <300/g | <300/g | <300/g | <300/g |
| Cake | b | <300/g | <300/g | >100,000/g | 1,200/g | 1,300/g |
| Cake | a | 2,000/g | 2,500/g | 2,700/g | 3,700/g | >100,000/g |
|  | b | 2,000/g | >100,000/g | >100,000/g | * | * |

As shown above, when (a) the sample is placed in the food preservation container 108 and then placed in the refrigerator, the propagation of bacteria is restrained and the long-term storage of the sample is possible, compared to when (b) the sample is directly placed in the refrigerator.

In addition, for the above conditions, when frequency of high volume-weak pulse electric current is lowered to 25 Hz to 35 Hz, the restraint of propagation of bacteria increased.

Figure 12:
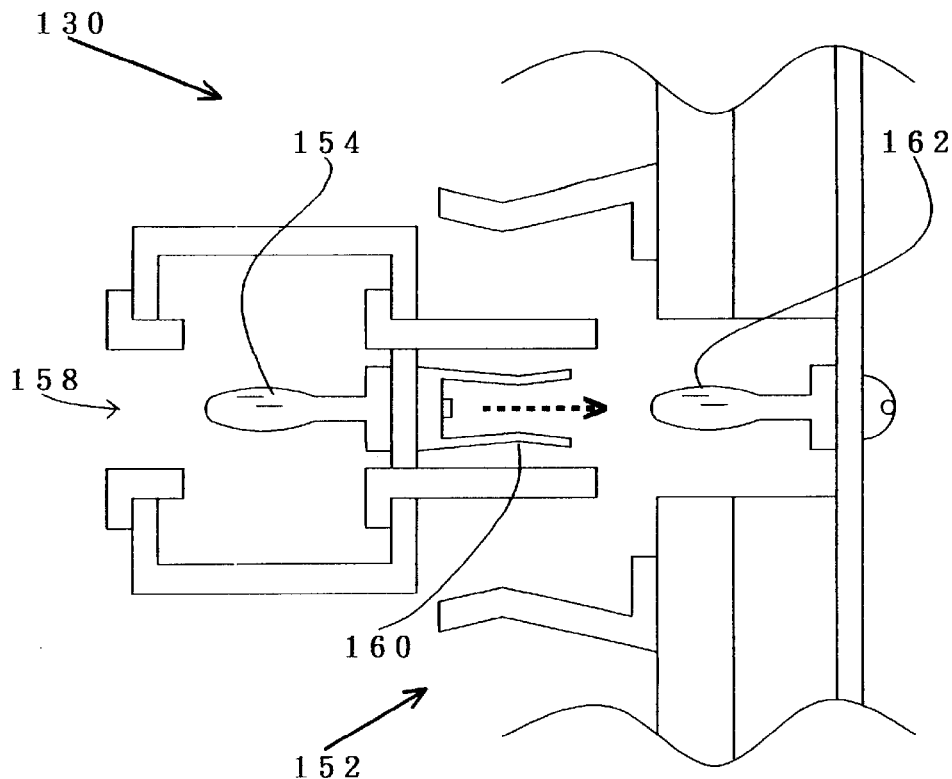
FIG. 12 illustrates a side cross-sectional view of a single plug connection for connecting a repeater to a fryer.

The disclosed power supply 10, food preservation systems, and other components may be readily manufactured for interconnection and use. FIGS. 12–13 show an interconnection of a repeater 130 with the jack 152 for connection to the food preservation container 108, in which at least one plug 154, 156 is provided to receive, through an positioned over a sealed board 182 upon another magnetic component 184. The magnetic components 176–180 and 184 may have the dimensions of 36 mm., 53 mm., 72 mm., and 85 mm., respectively. The transformer 16 may have a rating of AC 220V, 60 Hz, 10 kV, and 30 MA, and may have an iron core composed of a "KANTO" T-54, H-14, 0.5t, and a width of 60 mm. The primary winding 14 may be UL 1015, AWG22, 200 mm, and the secondary winding may be Silicon Rubber, 20KVDC, 150° C., VW-1. During fabrication of the transformer 16, the components may be impregnated and only the coil is dried. After inserting the iron core, the components may be fastened using metal fittings, and then impregnated again. "NOMEX", polyester film or "TEFLON" may be used for an insulating support of the coil and the iron core, and polyester film may be used for the layer insulation of the coil.

FIG. 20 illustrates the general construction of the disclosed preservation system in which an electrical source 12, such as 100 V of alternating current is provided to a transitional or intermediate controller 132, and then to a low-frequency, high voltage electricity transformer as the power supply 10, which generates the high voltages, which are applied to the repeater 130 as a transmitter to the preservation containers, such as an outer box 108 containing the food or other organic materials to be preserved.

The disclosed preservation system and method have been described by way of the preferred embodiment. However, numerous modifications and substitutions may be made without departing from the spirit of the invention. For example, the use of the disclosed power supply 10 and devices using the power supply 10 is not restricted to the examples described herein. For instance, in the examples described above, one secondary pole is connected to output section 20 and the other secondary pole 22 may be sealed inside the resin material 26, instead of sealing the other pole 22 by shortening the secondary winding of transformer 16 through the resistor 24. Thus, this invention may be transformed into different forms of usage without deviating from its objective. Accordingly, the invention has been described by way of illustration rather than limitation.

| List of Reference Numerals | | | |
|---|---|---|---|
| 10 | power supply | 98 | insulation plate |
| 12 | plug | 100 | set of screws |
| 14 | primary coil or winding | 102 | conducting wire |
| 16 | transformer | 104 | heater |
| 18 | secondary coil or winding | 106 | food preserving system |
| 20 | output section | 108 | food container |
| 22 | second pole | 110 | upward opening |
| 24 | resistor | 112 | electrode |
| 26 | resin material | 114 | protector |
| 28 | circuit breaker | 116 | holes |
| 30 | display light | 118 | lid |
| 32 | choking coil | 120 | reflective plate |
| 34 | casing | 122 | repeater |
| 36 | core | 124 | wire connection |
| 38 | terminal | 126 | ports |
| 40 | terminal | 128 | hinges |
| 42 | power control switch | 130 | repeater |
| 44 | power control switch | 132 | intermediate controller |
| 46 | control circuit | 134 | frame |
| 48 | adjustable transformer | 136 | insulating layer |
| 50 | voltmeter | 138 | food preservation container |
| 52 | control relay | 140 | wall |
| 54 | output switch | 142 | wall |
| 56 | sensor input | 144 | interior surface |
| 58 | outside sensor | 146 | interior surface |
| 60 | final output contact | 148 | electric contact |
| 62 | high voltage display circuit | 150 | electric contact |
| 64 | lamp | 152 | jack |
| 66 | transformer | 154 | plug |
| 68 | bridge | 156 | plug |
| 70 | capacitor | 158 | receptacle |
| 72 | resistor | 160 | socket |
| 74 | variable resistor | 162 | plug |
| 76 | food reserving system | 164 | plug |
| 78 | fryer | 166 | head portion |
| 80 | container | 168 | receptacles |
| 82 | connection | 170 | sockets |
| 84 | ground | 172 | insulating layer |
| 86 | electrode | 174 | axial core conductor |
| 88 | throughholes | 176 | magnetic component |
| 90 | spacers | 178 | magnetic component |
| 92 | screws | 180 | magnetic component |
| 94 | insulation blocks | 182 | sealed board |
| 96 | protector | 184 | magnetic component |

What is claimed is:

1. A power supply comprising:
   an input section connected to an alternating-current electric source for providing an operating voltage;
   a transformer for voltage elevation of the operating voltage whose primary winding is connected to the input section; and
   an output section connected to a secondary winding of the transformer;
   wherein a secondary winding of the transformer has a first pole connected to the output section and has a second pole blocked, to provide the elevate voltage to the first pole.

2. The power supply of claim 1, further comprising:
   an insulation resin in which the transformer is located; and
   wherein the second pole of the secondary winding is sealed inside the insulation resin.

3. The power supply of claim 1, wherein the first and second poles of the secondary winding are connected to each other by a resistor connected in parallel to the secondary winding of the transformer.

4. The power supply of claim 1, further comprising:
   a choking winding connected in series with the primary winding of the transformer and located at the primary winding of the transformer.

5. A food preserving system comprising:
   a food preserving container having an insulated food preserving space; and
   a power supply having:
      an input section connected to an alternating-current electric source for providing an operating voltage;
      a transformer for voltage elevation of the operating voltage whose primary winding is connected to the input section; and
      an output section connected to a secondary winding of the transformer;
      wherein a secondary winding of the transformer has a first pole connected to the output section and has a second pole blocked, to provide the elevated operating voltage to the first pole; and
   wherein the first pole of the power supply is connected to the food preserving container and is located in the insulated food preserving space.

6. The food preserving system of claim 5, wherein the food preserving container includes a grounding section which connects the food preserving container to ground, being the earth electric potential.

7. The food preserving system of claim 5, wherein the container includes:
   a main body having at least one side with an opening therethrough to provide the food preserving space; and
   a lid for closing the opening of the main body.

8. The food preserving system of claim 7, wherein the power supply includes:
   a sensor that detects a shut-off condition and generates a shut-off signal; and
   a circuit, responsive to the shut-off signal from the sensor, which shuts off the elevated voltage to the output section.

9. The food preserving system of claim 8, wherein the shut-off condition includes one of detection of a human body and detection of an opening of the lid.

10. A high voltage-weak pulse electric current applicator for food, the applicator comprising:

a transformer which generates a high voltage-weak pulse electric current, and having:
   a primary winding is connected to an alternating-current power supply; and
   a pair of poles of the secondary winding, with a first pole for generating the high voltage-weak pulse electric current, and a second pole is sealed to an insulated board;
wherein the transformer applies the high voltage-weak pulse electric current to the food.

* * * * *

UNITED STATES PATENT AND TRADEMARK OFFICE
CERTIFICATE OF CORRECTION

PATENT NO : 6,138,555
DATED : October 31, 2000
INVENTOR(S) : Kazuyoshi Hata

It is certified that error appears in the above-identified patent and that said Letters Patent are hereby corrected as shown below:

ON THE TITLE PAGE

Assignees, line 1, delete "Kowa Business Planning of America, Ltd." and insert in its place --Kowa U.S.A. Corporation--.

Assignees, line 2-3, delete "Hata Kazuyoshi" and insert in its place --Kazuyoshi Hata--.

Signed and Sealed this

Eighth Day of May, 2001

Attest:

NICHOLAS P. GODICI

*Attesting Officer*   *Acting Director of the United States Patent and Trademark Office*